US007185340B1

(12) United States Patent
Hersh (10) Patent No.: US 7,185,340 B1
(45) Date of Patent: Feb. 27, 2007

(54) MULTIPHASE SYSTEM AND METHOD OF PERFORMING OPERATIONS ON DATA STRUCTURES

(75) Inventor: Clifford L. Hersh, Berkeley, CA (US)

(73) Assignee: Ants Software, Inc., Burlingame, CA (US)

( * ) Notice: Subject to any disclaimer, the term of this patent is extended or adjusted under 35 U.S.C. 154(b) by 823 days.

(21) Appl. No.: 09/976,930

(22) Filed: Oct. 11, 2001

(51) Int. Cl.
G06F 9/44 (2006.01)

(52) U.S. Cl. .................. 719/312; 719/314; 718/100; 707/103 Z (58) Field of Classification Search ........ 718/100–108; 707/1–10, 100–104.1, 200–206; 719/314, 719/313
See application file for complete search history.

(56) References Cited

U.S. PATENT DOCUMENTS

| 4,847,754 A | * | 7/1989 | Obermarck et al. ........ 718/104 |
| 5,222,238 A | * | 6/1993 | Zobre et al. ................ 710/240 |
| 5,781,910 A | * | 7/1998 | Gostanian et al. .......... 707/201 |
| 6,868,414 B2 | * | 3/2005 | Khanna et al. ................ 707/3 |

FOREIGN PATENT DOCUMENTS

EP 466339 A2 * 1/1992

OTHER PUBLICATIONS

Farook, Mohammad et al. "Managing Long Linked Lists using Lock Free Techniques." University of Manitoba, Canada. Oct. 1998.*
Prakash, Sundeep et al. "Non-Blocking Algorithms for Concurrent Data Structures." Dept. of Computer and Information Sciences, University of Florida. Jul. 1, 1991.*
Prakash, Sundeep et al. "A Non-Blocking Algorithm for Shared Queues Using Compare-and-Swap." IEEE. May 1994.*
Volois, John D. "Lock-Free Linked Listss Using Compare-and-Swap." ACM. 1995.*
Michael, Maged M. et al. "Simple, Fast, and Practical Non-Blocking and Blocking Concurrent Queue Algorithms". ACM 1996.*
Stone, Janice M. "A Simple and Correct Shared Queue Algorithm using Compare-and-Swap." IEEE. 1990.*
IBM Technical Disclosure Bulletin. "Serialization of AVL-Binary Tree Element Retrieval via Duplexed Pointers." Mar. 1992.*
Baer et al., "A Comparison of Tree-Balancing Algorithms," Communications of the ACM, vol. 20, Issue 5, pp. 322-330 (May 1977).
Cannady, "Balancing Methods for Binary Search Trees," Proceedings of the 16th Annual ACM Southeast Regional conference, pp. 181-186 (1978).

* cited by examiner

Primary Examiner—Lewis A. Bullock, Jr.
(74) Attorney, Agent, or Firm—Carr & Ferrell LLP (57) ABSTRACT

A method for executing operations upon a linked data structure having at least one element such that the time during which the linked data structure is locked is reduced. The method includes performing a first set of operation tasks in a first phase, the first set of operation tasks being operable to effect a first set of element state transitions. A second set of operation tasks is developed in the first phase, the second set of operation tasks being operable to effect a second set of element state transitions, the second set of element state transitions being distinct from the first set of element state transitions. The second set of operation tasks is performed in a second phase. The method finds particular implementation in the rebalancing of tree data structures.

31 Claims, 8 Drawing Sheets

MULTIPHASE SYSTEM AND METHOD OF PERFORMING OPERATIONS ON DATA STRUCTURES

CROSS-REFERENCE TO RELATED APPLICATIONS

This application is related to co-pending application Ser. No. 09/729,515 entitled "Method and System for Enhanced Concurrency in a Computing Environment," by Clifford L. Hersh and Herbert W. Sullivan, filed on Dec. 4, 2000 still pending, co-pending application Ser. No. 09/884,280 U.S. Pat. No. 7,039,865, entitled "System and Method for Determining the Commutativity of Computational Operations," by Clifford L. Hersh, filed on Jun. 19, 2001 and specifically incorporated herein by reference, co-pending application Ser. No. 09/884,243 U.S. Pat. No. 6,760,726 entitled "System and Method for Managing Concurrent Operations on Linked Lists," by Clifford L. Hersh, filed on Jun. 19, 2001, and co-pending application Ser. No. 09/976,931, STILL PENDING, entitled "System and Method for Deferred Rebalancing of a Tree Data Structure" filed on even date herewith.

STATEMENT REGARDING FEDERALLY SPONSORED RESEARCH OR DEVELOPMENT

Not Applicable

BACKGROUND OF THE INVENTION

1. Field of the Invention

The invention relates generally to the field of computer algorithms and more particularly to a multiphase system and method of performing operations upon data structures.

2. Background Information

Data structures, such as linked lists, trees, sets, and graphs are well known in the computing arts and are used to store information in a logical and efficient manner for access and operation by computing processes. Computing processes operable upon such data structures include operations for inserting, deleting, and updating data structure elements. Such computing processes include concurrent operations such as operations upon a data structure element and operations upon a row including the data structure element.

Systems and methods of the prior art avoid conflicts between concurrent operations by locking the affected data structure or a portion thereof affected by concurrent operations. In this manner the integrity of the data structure being operated upon as well as the integrity of the information stored therein is ensured. Such locking further ensures that concurrent operations operating upon a same element of the data structure or upon the information stored in the same element are performed in the correct sequence to thereby eliminate corruption of the information or error conditions.

Thus for example, concurrent operations such as updating entries in a database are conventionally stored in an ordered list of pending operations. For each pending operation on the list, upon execution of the operation, an affected row in the database is locked until the operation is completed. The affected row is locked in order that other pending operations do not intercede and produce inconsistent results. For example, if the ordered list includes two updates to a cell in the database row, the affected row is locked while a first update operation executes and commits thus preventing a second update operation from concurrently executing. In this manner, the integrity of the database is maintained.

The execution of such operations using locks is expensive. Locking of the data structure can result in significant performance degradation of data structure operations because one operation may have to wait for another operation to complete. Additionally, while the data structure is locked, processes are precluded from reading information from the data structure.

What is needed are systems and methods for performing operations upon data structures which reduce and/or eliminate the need to lock the data structure or the portion thereof being operated upon during the execution of concurrent operations. Such systems and methods preferably reduce the time during which data structures operated upon are locked.

BRIEF SUMMARY OF THE INVENTION

A method for executing operations upon a linked data structure having at least one element includes performing a first set of operation tasks in a first phase in which the linked data structure is not locked. The first set of operation tasks is operable to effect a first set of state transitions characterized by navigation of at least an existing link of the linked data structure.

The method further includes developing a second set of operation tasks, the second set of operation tasks operable to effect a second set of element state transitions characterized by at least a pointer to the linked data structure. The second set of element state transitions is distinct from the first set of element state transitions and a portion of the linked data structure being operated upon by the operation is locked during the execution of the second set of operation tasks. The second set of operation tasks is performed in a second phase and instructions for carrying out the second set of operation tasks are executed atomically.

The system and method of the invention find particular implementation in the rebalancing of tree data structures. It has been found that the rebalancing of a tree data structure can be advantageously deferred. More particularly, the method of the invention finds particular use in such deferred rebalancing including executing a first set of rebalancing operation tasks in the first phase and a second set of rebalancing operation tasks in the second phase.

DETAILED DESCRIPTION OF THE INVENTION

It has been discovered that the execution of operations upon a data structure can be divided into two phases in such manner that the overall efficiency of a computing system is improved. In an update phase, update phase state transitions of operations as further described herein are executed concurrently thus eliminating the need to lock the affected data structure. During the update phase, the data structure can still be traversed using existing links thereby enabling read operations to execute.

In a commit phase, commit phase state transitions of the operations are executed in an ordered manner. During the commit phase, affected elements of the data structure are locked and the commit phase state transitions are executed atomically. Such transitions include the breaking of existing links thereby precluding the execution of operations requiring navigation of the data structure, such as read operations.

The system and method of the invention provide for overall improvement in the efficiency of the computing system by reducing the time during which the data structure is locked. Furthermore, the system and method of the invention provide for improved efficiency in the case where the computing system is heavily loaded and for improved responsiveness in the case where the computing system is not heavily loaded.

Figure 1:
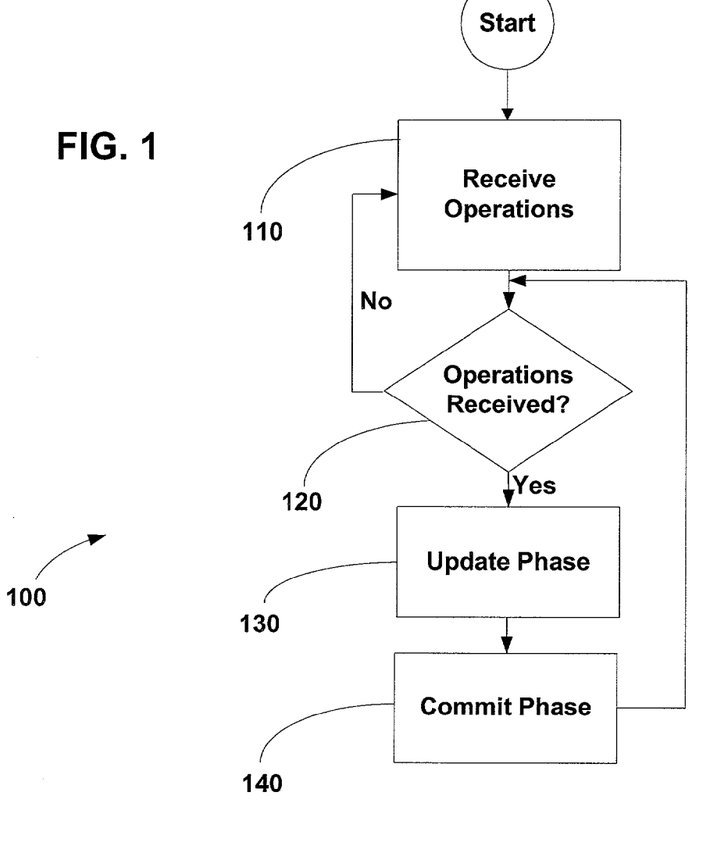
FIG. 1 illustrates a flowchart illustrating a method according to one embodiment of the invention.

In accordance with one embodiment of the invention and with reference to FIG. 1, a process generally designated 100 for executing operations upon a data structure includes a first step 110 in which operations upon a data structure are received and queued in a task queue. Such operations include insertion, deletion and update operations which can further be divided into distinct operation tasks as is well known in the art. Update operations, which include modification of a value of a data structure element, can be executed as an insertion of a new data structure element followed by deletion of an old data structure element.

In a step 120 the process 100 checks if any operations have been received in step 110. If any operations have been received, then in a step 130 the update phase state transitions of the received operations are either executed or postponed in the update phase as further described herein. Operations postponed are returned to the task queue. In a step 140 the commit phase state transitions of the received operations which have not been postponed are executed in the commit phase. If no operations have been received as determined in step 120, the process 100 returns to step 110 and waits to receive operations. Upon completion of the commit phase in step 140, the check performed in step 120 is repeated.

During the execution of the update phase of step 130 and the commit phase of step 140, additional operations may be received and queued by step 110 for later execution in steps 130 and 140. Thus the number of operations executed in steps 130 and 140 is dependent upon the number of operations queued in step 110. Process 100 thus executes operations in such manner that if a small number of operations are queued in step 110, a small number of operations are executed in steps 130 and 140 and if a large number of operations are queued in step 110, a large number of operations are executed in steps 130 and 140.

It has been found that the process 100 operates to improve the efficiency of the computing system. In the case where relatively few operations are received in step 110, then the process 100 achieves improved responsiveness. If on the other hand, a relatively large amount of operations are received in step 110, then the process 100 achieves improved efficiency by reducing the number of times the process 100 switches between the update phase of step 130 and the commit phase of step 140.

Figure 2:
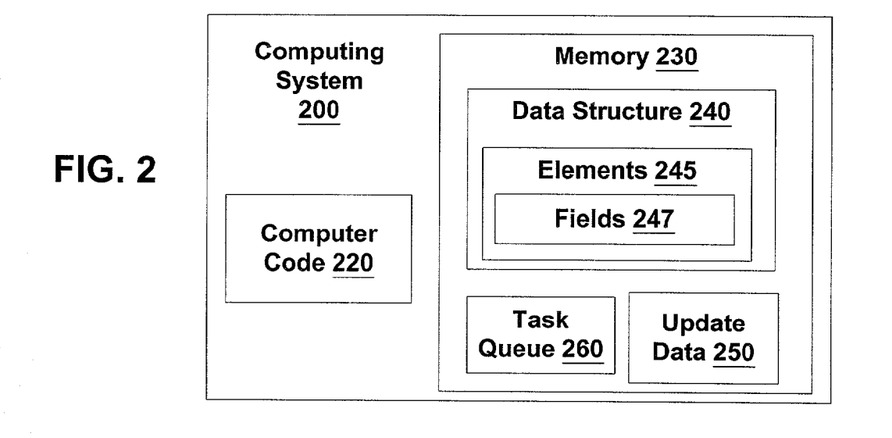
FIG. 2 illustrates a computing system in which an embodiment of the invention may be practiced.

The invention may be practiced in a computing system 200 such as illustrated in FIG. 2. Computing system 200 includes computer code 220 having computer instructions for performing processes of the invention, and memory 230 for storing task queue 260, update data 250, and a data structure 240, as further described herein. Computer code 220 is optionally stored in memory 230. Computing system 200 and the components included therein are optionally distributed over a plurality of computing devices.

Data structure 240 is preferably a linked structure and includes a plurality of elements 245, such as nodes or list elements as is well known in the art. Elements 245 further include fields 247 such as data fields and links which enable the linked structure. While data structure 240 has been described in terms of nodes and list elements, those skilled in the art will recognize that data structure 240 may include any data organization that uses links or the like to associate and establish relationships between data structure elements 245.

According to one embodiment of the invention, operations upon the data structure 240 include state transitions between defined states as listed in Table 1. An element 245 of data structure 240 affected by the execution of a given operation includes a corresponding state field preferably stored in field 247.

TABLE 1

Pre-Associated
Pending Insert
Valid
Pending Delete
Deleted
Hidden
Invalid

Thus, for example, an insertion operation includes state transitions between a pre-associated state, in which an element 245 to be inserted into data structure 240 is created, to a pending insert state, in which the element 245 to be inserted is linked to the data structure 240 at an insertion point while an existing link at the insertion point is maintained, to a valid state, in which the existing link at the insertion point is removed.

In similar fashion, a deletion operation includes state transitions between a valid state in which an element 245 to be deleted from data structure 240 remains linked to other elements 245 at a deletion point, to a pending delete state in which a link is created between the elements 245 in data structure 240 linked to the element 245 to be deleted, to a deleted state, in which the element 245 to be deleted is no longer linked to the data structure 240.

Additional states include an invalid state and a hidden state. An example of element 245 being in an invalid state is when the element 245 has been deleted from the data structure but the deleted element still physically exists. Additional clean up processes physically delete the deleted element 245. Preferably, such clean up processes execute in the commit phase of step 140 (FIG. 1).

An element 245 is in the hidden state following a rollback request in which the element 245 to be inserted is hidden from all operations. As further described herein, an element 245 in the hidden state may undergo a state transition from the hidden state to the invalid state as well as a state transition from the hidden state to the pending insert state.

As explained herein, state transitions are executed in either the update phase of step 130 or the commit phase of step 140 (FIG. 1), those executed in the update phase of step 130 including a first set of state transitions and those executed in the commit phase of step 140 including a distinct second set of state transitions. Table 2 lists state transitions and the phase in which each is executed.

TABLE 2

| Update Phase | Commit Phase |
| --- | --- |
| Valid to Pending Delete | Pending Insert to Valid |
| Pre-associated to Pending Insert | Pending Delete to Invalid |
| Pending Insert to Hidden | Hidden to Invalid |
|  | Invalid to Deleted |
|  | Pending Delete to Valid (rollback only) |
|  | Hidden to Pending Insert (rollback only) |
|  | Pending Insert to Invalid (rollback only) |

The update data 250 (FIG. 2) are developed during the update phase of step 130 (FIG. 1) as further described herein. Such development involves navigation of the data structure 240 (FIG. 2). Thus for example, the state transition from the valid state to the pending delete state involves navigation to the point of deletion in the data structure 240. Such navigation involves the traversal of links between data structure element 245 as is well known in the art.

The state transition from the pre-associated state to the pending insert state similarly involves navigation to the point of insertion in the data structure 240. The state transition from the pending insert state to the hidden state also involves navigation to the insertion point.

During the update phase of step 130 (FIG. 1), update data 250 is developed by computer code 220 (FIG. 2) in the form of a First In Last Out (FILO) stack. Update data 250 includes address data relating to the locations of elements 245. This address data is used in the commit phase of step 140 (FIG. 1) in place of navigating data structure 240 (FIG. 2). Update data 250 further includes instructions for inserting and deleting data structure elements as further described herein.

Figure 3:
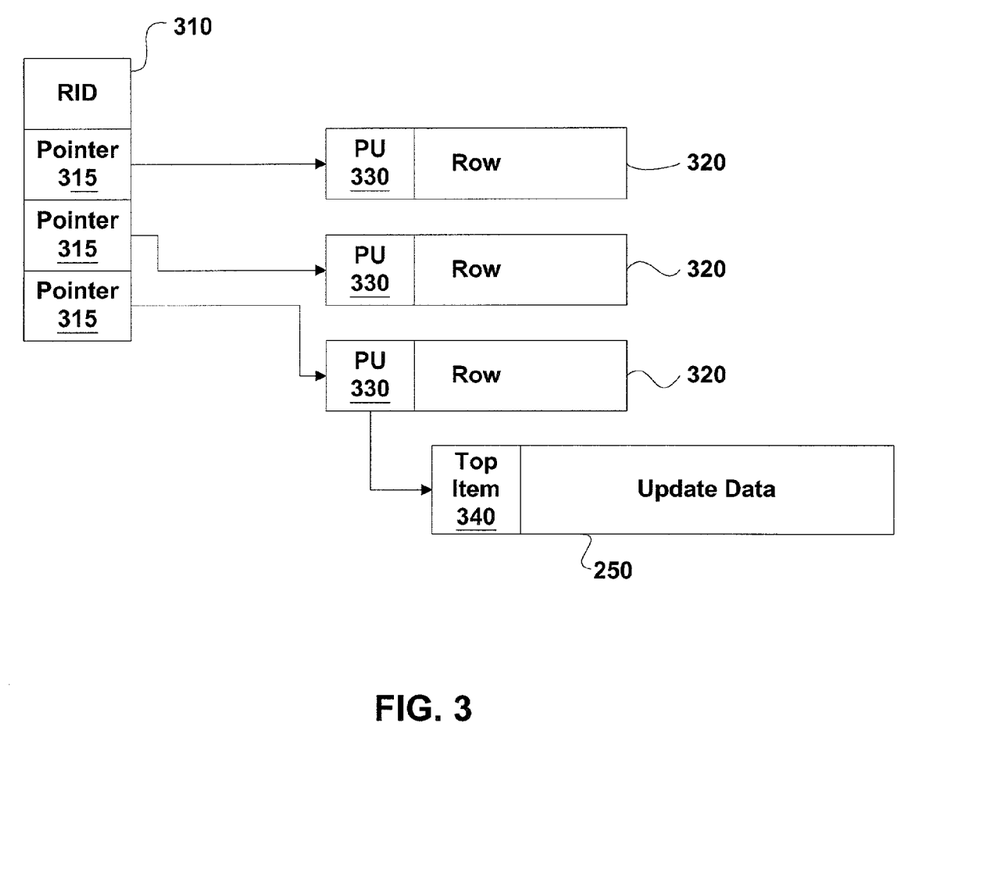
FIG. 3 illustrates a block diagram illustrating a relationship between update data and a row identifier index (RID)

FIG. 3 is a block diagram illustrating a relationship between update data 250 (FIG. 2) and a row identifier index (RID) 310 of a type well known in the art. The RID 310 is used to provide a convenient means for accessing update data 250. RID 310 is a table of pointers 315 pointing at table rows 320 that hold elements 245 of data structure 240 (FIG. 2).

In the present invention each table row 320 includes a pending update field (PU) 330 that holds a pointer to update data 250 if update data 250 associated with that row 320 exists. If a specific PU field 330 holds a NULL pointer created when a specific row 320 is developed, then update data 250 associated with the specific row 320 does not exist and no updates are pending on a particular element 245 of data structure 240 associated with the specific row 320. If PU 330 holds a non-NULL pointer then the pointer points to update data 250 associated with the particular element 245.

Update data 250 is developed during the update phase of step 130 (FIG. 1). For each task in task queue 260 (FIG. 2) that includes a commit phase state transition, a new top item 340 is added to update data 250. The previous top item becomes a second item (not shown) in the FILO stack of update data 250. Top item 340 includes information to be used in the commit phase of step 140 (FIG. 1) to complete the operation. For example, the information includes instructions for changing the state of element 245 from the pending insert state to the valid state.

When added to update data 250, top item 340 includes a flag (not shown) indicating that conflicts have not been checked. Upon encountering such a flag, computer code 220 searches update data 250 for possible conflicts including operations executing upon the same element 245. If no conflicts are found then the flag is modified to indicate that no conflicts exist. If a conflict is found then a rollback of the operation is scheduled for the next commit phase as further described herein, and in particular with reference to FIG. 5.

During the commit phase of step 140 (FIG. 1) computer code 220 traverses RID 310 and examines each row 320 for a non-NULL PU field 330. For each non-NULL PU field 330, update data 250 is processed from the top down. When the last operation instructions in the update data 250 are executed, the associated PU 330 is reset to NULL and computer code 220 proceeds to the next pointer 315 in the RID 310 table.

The instructions from update data 250 include a pointer to the data elements 245 within data structure 240 operated on during the update phase of step 130. These pointers eliminate the need for computer code 220 to navigate through data structure 240 during the commit phase of step 140. The FILO structure of update data 250 forces operations to be performed in an order that assures no conflicts.

Figure 4A:
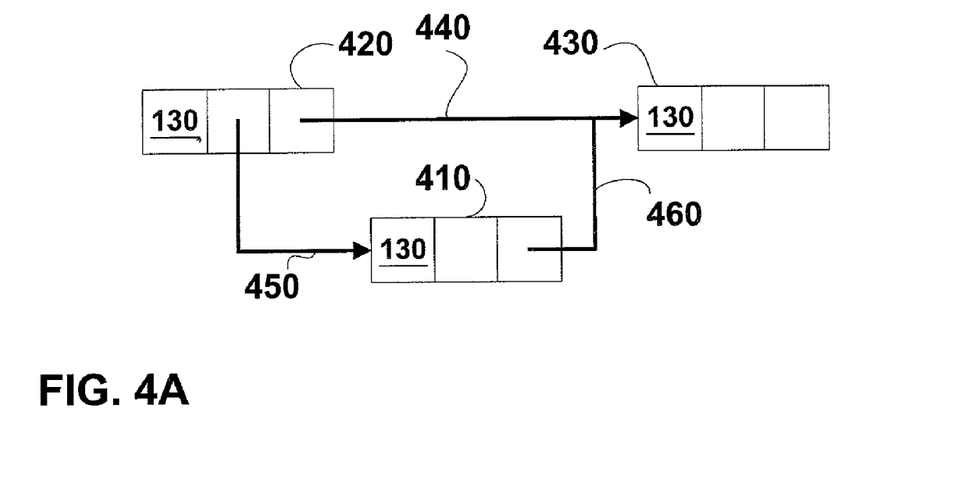
FIG. 4A illustrates the result of a pre-associated to pending insert operation at the conclusion of an update phase.

An element insertion operation includes, as stated previously, the state transitions from pre-associated to pending insert to valid. FIG. 4A illustrates the result of a state transition from the pre-associated state to the pending insert state at the conclusion of the update phase of step 130 (FIG. 1). A new element 410 of a type well known in the art is being inserted into data structure 240 between a first element 420 and a second element 430. An existing link 440 points from first element 420 to second element 430. Link 440 remains visible to all processes other than the insertion operation at the conclusion of the update phase of step 130. In this manner, the integrity of data structure 240 is maintained. A new link 450 points from first element 420 to new element 410. New link 450 is visible to the insertion operation during the update phase of step 130 and is not visible to other operations until the commit phase of step 140 (FIG. 1). New element 410 (FIG. 4) also includes a link 460 pointing to second element 430.

Figure 4B:
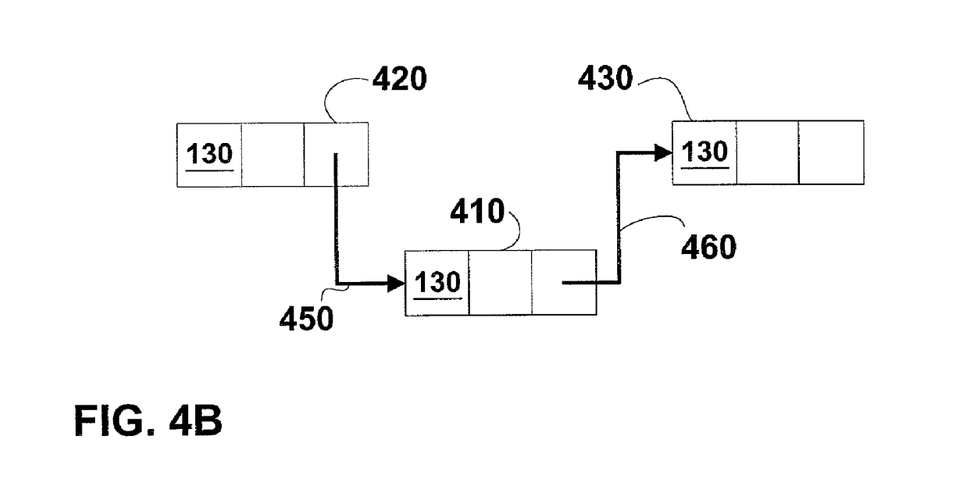
FIG. 4B illustrates the result of the pre-associated to pending insert operation discussed in relation to FIG. 4A after a commit phase.

FIG. 4B illustrates the result of a state transition from the pending insert state to a valid state at the conclusion of the commit phase of step 140 (FIG. 1). During the commit phase computer code 220 removes link 440 and makes new links 450 and 460 visible to all processes. Both of these operations are executed atomically. In the preferred embodiment all operations executed during the commit phase of step 140 are atomic operations.

Figure 5:
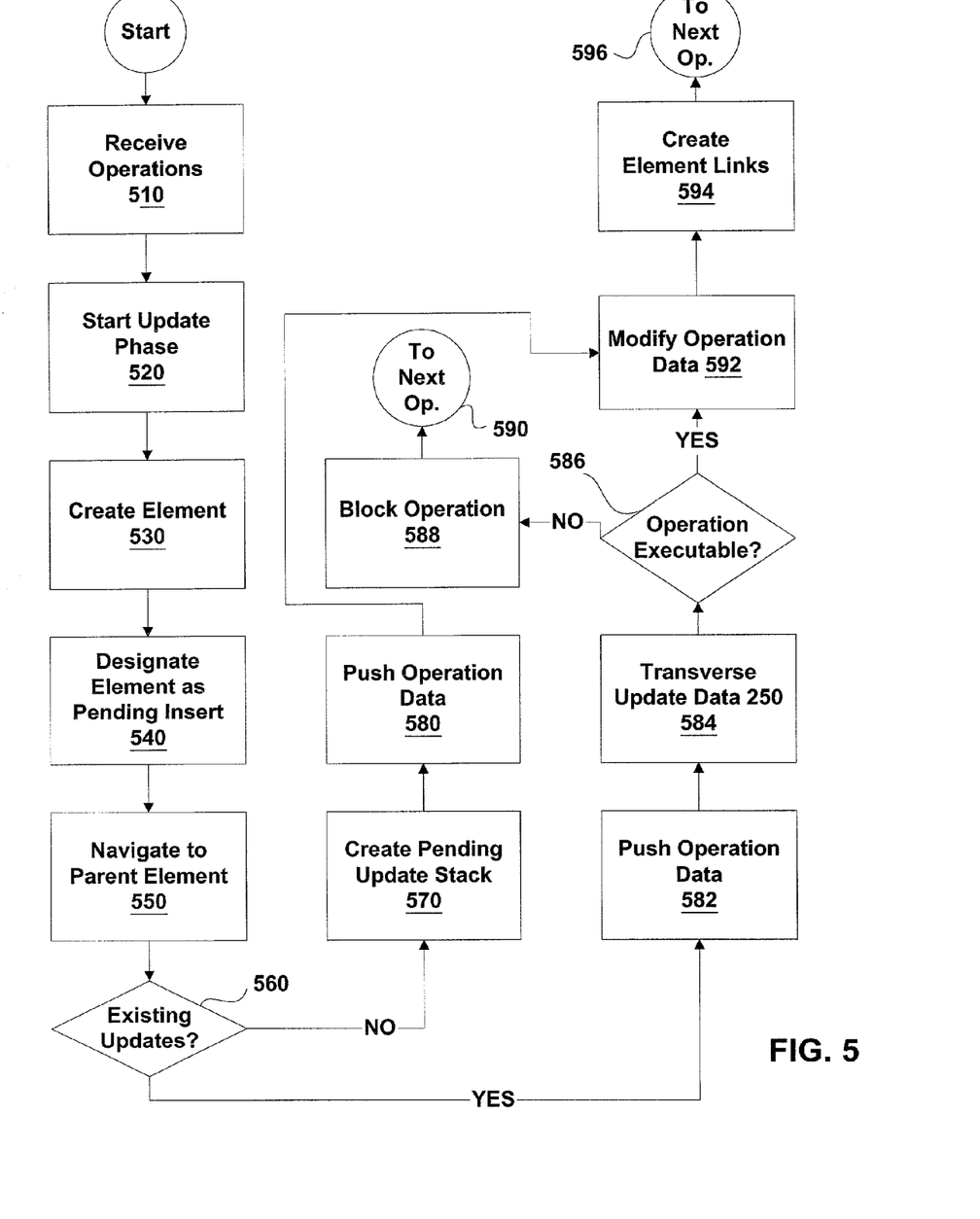
FIG. 5 is a flow chart illustrating the update phase of an insertion of a new element into a data structure according to one embodiment of the invention.
Figure 6:
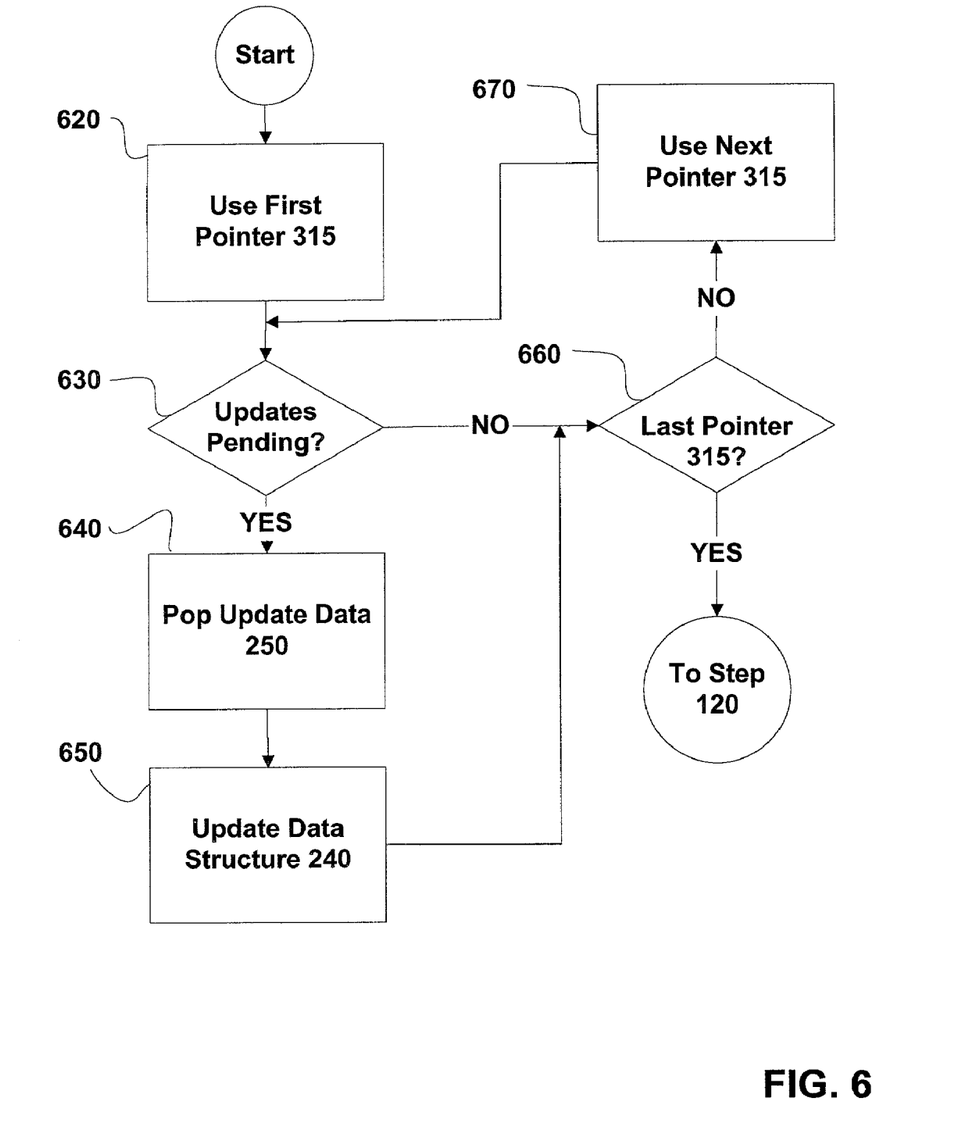
FIG. 6 is a flow chart illustrating the commit phase of an insertion of a new element into a data structure according to one embodiment of the invention.

FIGS. 5 and 6 further illustrate the process steps for inserting new element 410 (FIG. 4) into data structure 240 (FIG. 2) according to one embodiment of the invention. With reference to FIG. 5, the process steps of the insertion operation which occur during the update phase of step 140 (FIG. 1) are illustrated. In accordance with the process of FIG. 1, in a step 510 computer code 220 receives operations operable upon data structure 240 from task queue 260. In this example the first operation in task queue 260 is an insertion operation of new element 410.

In a step 520 the update phase of step 130 starts. In a step 530 new element 410 to be inserted by the insertion operation is created by computer code 220 if new element 410 does not already exist and a field 247 of the new element 410 is modified to indicate that new element 410 is in the pre-associated state.

In a step 540 field 247 within new element 410 is modified to indicate that new element 410 has transitioned from the pre-associated state to the pending insert state.

In a step 550 computer code 220 navigates through data structure 240 to first element 420 which will become a parent of new element 410 if the insertion operation executes successfully. Step 550 further includes the execution of tasks associated with the insertion of new element 410 such as creating links 450 and 460 and a pointer to the insertion point for use during the commit phase of step 140 (FIG. 1).

In a decision step 560, computer code 220 determines if there are existing update data 250 associated with the row 320 in which link 450 to new element 410 is being inserted. If no such update data 250 yet exists, then, in a step 570, memory for update data 250 is allocated and pointed to by PU 330 as described herein and illustrated in FIG. 3.

In a step 580 instructions for transitioning the state of first element 420 from the pending insert state to the valid state during the commit phase of step 140 (FIG. 1) are written to (pushed on) update data 250 and become top item 340. The written instructions include a flag (not shown) indicating that conflict tests have not been checked for the insertion operation.

Returning to decision step 560, if update data 250 associated with the row in which link 450 to new element 410 to be inserted already exists, then computer code 220 executes a step 582 identical to step 580. After writing data to update data 250 computer code 220 traverses update data 250 in a step 584, testing for operations that would conflict with the insertion of new element 410. Methods of identifying conflicting operations include those described in co-pending application entitled "System and Method for Determining the Commutativity of Computational Operations."

In a decision step 586 computer code 220 considers if conflicting operations were found in step 584. If a conflicting operation is identified then the insertion operation is not executable and the insertion is blocked from completion in a step 588. The blocking step 588 optionally includes postponing the execution of the operation by returning the insertion operation to task queue 260. Returning the operation to task queue 260 causes the operation to be retried during the next update phase of step 130 (FIG. 1). Computer code 220 then processes the next operation that was received in step 510.

If on the other hand it is determined in step 586 that the insertion operation can execute without conflicts, then in a step 592 the flag written in step 582 is modified to indicate that conflict tests have been checked. Similarly, the flag written in step 580 is modified to indicate that conflict tests have been checked. Note that although no conflict tests were performed following step 580, the flag written in step 580 is thus far the first data 250 associated with a particular row 320 and, hence, there can be no conflicts.

In a step 594 computer code 220 creates new links 450 and 460 pointing from first element 420 to new element 410 and from new element 410 to element 430 respectively. Links 450 and 460 are only visible to the process performing the insertion of new element 410. In a step 596 computer code 220 proceeds to the next operation that was received in step 510.

Once all update phase state transition of operations received in step 510 are handled, then the update phase of step 130 (FIG. 1) is completed.

FIG. 6 illustrates the process steps of the insertion operation which occur during the commit phase of step 140 (FIG. 1) according to the invention. In a step 620 computer code 220 uses a first pointer 315 in RID 310 to navigate to the first row 320. In a decision step 630 PU 330 of the first row 320 is examined. If PU 330 is found to have a non-NULL value indicating that update data 250 for the first row 320 exists, computer code 220 proceeds to a step 640 in which top item 340 of update data 250 is read. In the exemplary case, PU 330 is non-NULL and computer code 220 then uses the read data in a step 650 to transition the state of element 410 being inserted from the pending insert state to the valid state. The data read, including the pointer to the insertion point, is used to complete the insertion of new element 410 by eliminating link 440 and making links 450 and 460 visible to all processes operating upon data structure 240.

Commit phase state transitions of additional operations received in step 510 are executed by reading and executing, in order, any remaining items of update data 250 associated with the first row 320. Upon execution of all items in such update data 250, the commit phase of step 140 determined in decision step 660 if all pointers 315 in RID 310 have been processed. Step 660 is executed directly after step 630 if the PU 330 examined in step 630 includes a NULL pointer. If all pointers 315 in RID 310 have been processed the method proceeds to step 120 (FIG. 1). Otherwise, the next pointer 315 is used in a step 670, analogous to step 620 to navigate to subsequent rows 320 where the associated PU 330 is examined as described herein.

While the update and commit phases of steps 130 and 140 (FIG. 1) have been described with reference to an insertion operation, any operation upon data structure 240 can be divided into the two phases described. Many multi-step operations, such as sorting elements 245, balancing of tree data structures, and the like, are combinations of insertions, and deletions, of elements 245 and can therefore be executed in the update and commit phases of steps 130 and 140.

The system and method of the invention find particular implementation in the rebalancing of tree data structures. Conventional systems either rebalance a tree data structure with every insertion or deletion of a node that causes the tree to become unbalanced, or allow the tree data structure to become unbalanced.

As is well known in the art, searches or traversals of an unbalanced tree are more costly than such operations on a balanced tree. This inefficiency has motivated the prior art to rebalance whenever the tree becomes unbalanced, however slightly.

It has been found that the rebalancing of a tree data structure can be advantageously deferred. More particularly, the method described with reference to FIG. 1 in which operations are divided into the update phase of step 130 and the commit phase of step 140 finds particular use in such deferred rebalancing.

Figure 7:
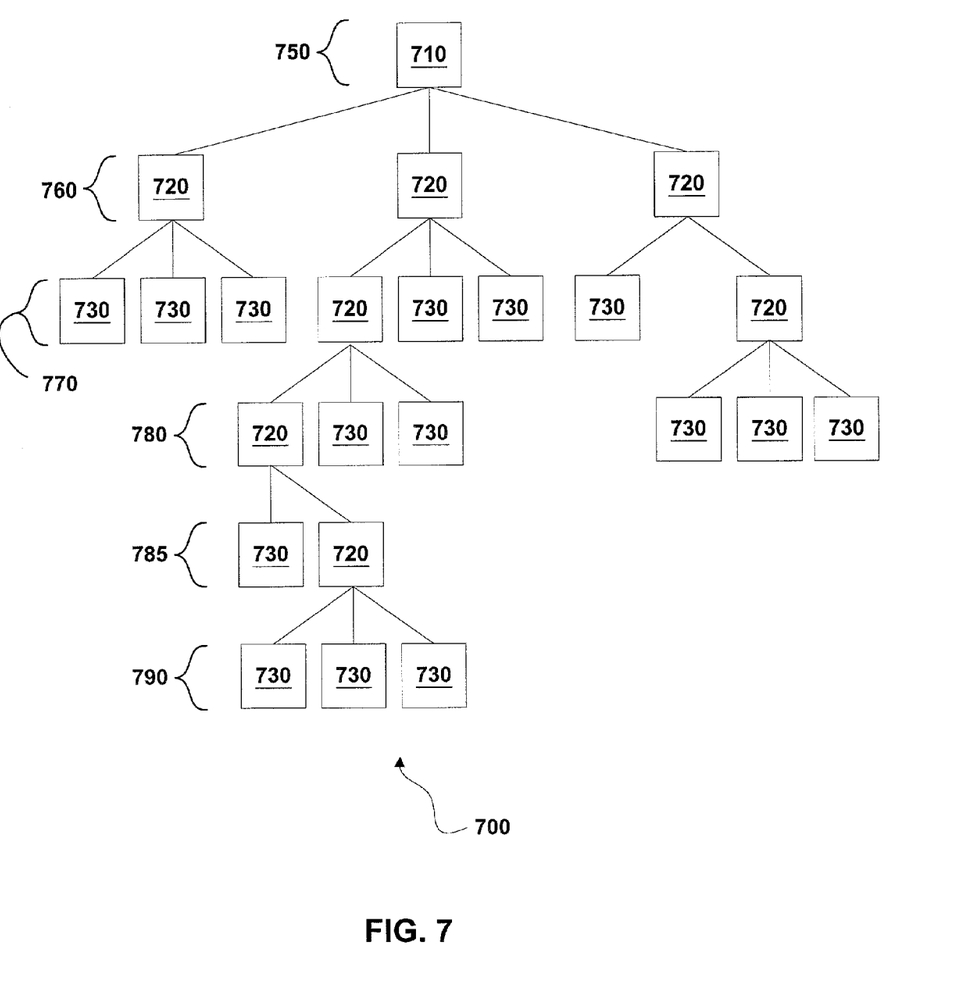
FIG. 7 illustrates a tree data structure whose balancing has been deferred.

With reference to FIG. 7, a tree data structure generally designated 700 is shown including a balanced portion having three levels generally designated 750, 760, and 770. Tree data structure 700 further includes an unbalanced portion having three levels generally designated 780, 785, and 790. In one aspect of the invention, the rebalancing of tree data structure 700 is advantageously deferred until the unbalanced portion of tree data structure 700 reaches a threshold number of levels.

It has been found that such deferred rebalancing minimally affects the average search of tree data structure 700. For example the maximum number of steps in a binary search of a binary tree data structure having n nodes is $\log_2 n$. Thus for a tree data structure 700 having 64K nodes, the maximum number of steps is 16. It has been found that bounding the length of the unbalanced portion of tree data structure 700 to two times the maximum number of steps in the binary search does not adversely affect the performance of the system in terms of the average number of steps taken to find a particular node of tree data structure 700.

Figure 8:
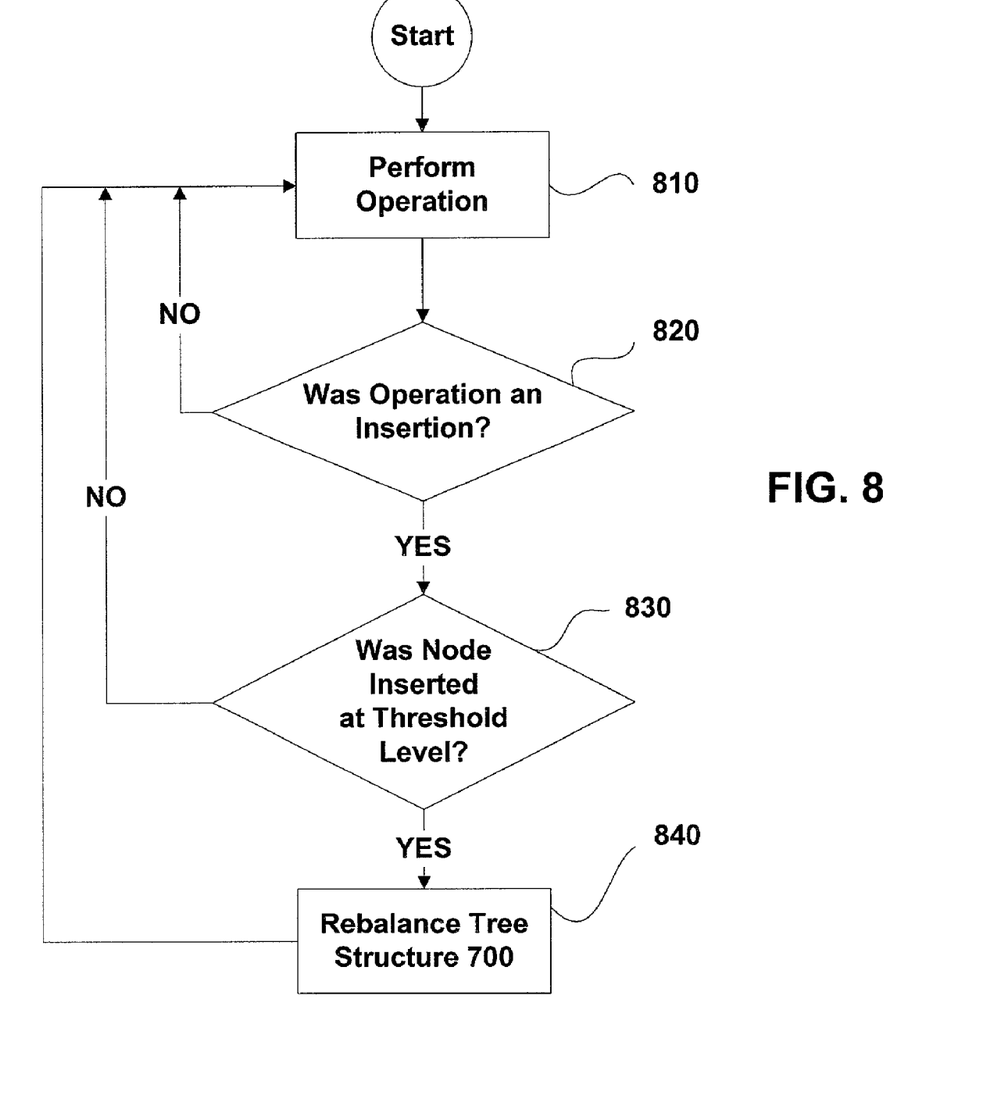
FIG. 8 is a flow chart illustrating a method of deferred balancing of a tree data structure according to one embodiment of the invention.

FIG. 8 illustrates a process, according to an embodiment of the invention, by which the unbalanced portion of tree data structure 700 is allowed to grow unbalanced until a leaf 730 is inserted at the threshold level of tree data structure 700. After this insertion occurs, the entire tree data structure 700 is rebalanced. By delaying the rebalancing, and allowing unbalanced sub-trees of length greater than one, the number of times the tree data structure 700 is rebalanced is reduced. This reduction saves the computational effort required to perform tree data structure rebalancing while still limiting the total depth of the tree data structure 700.

Figure 9:
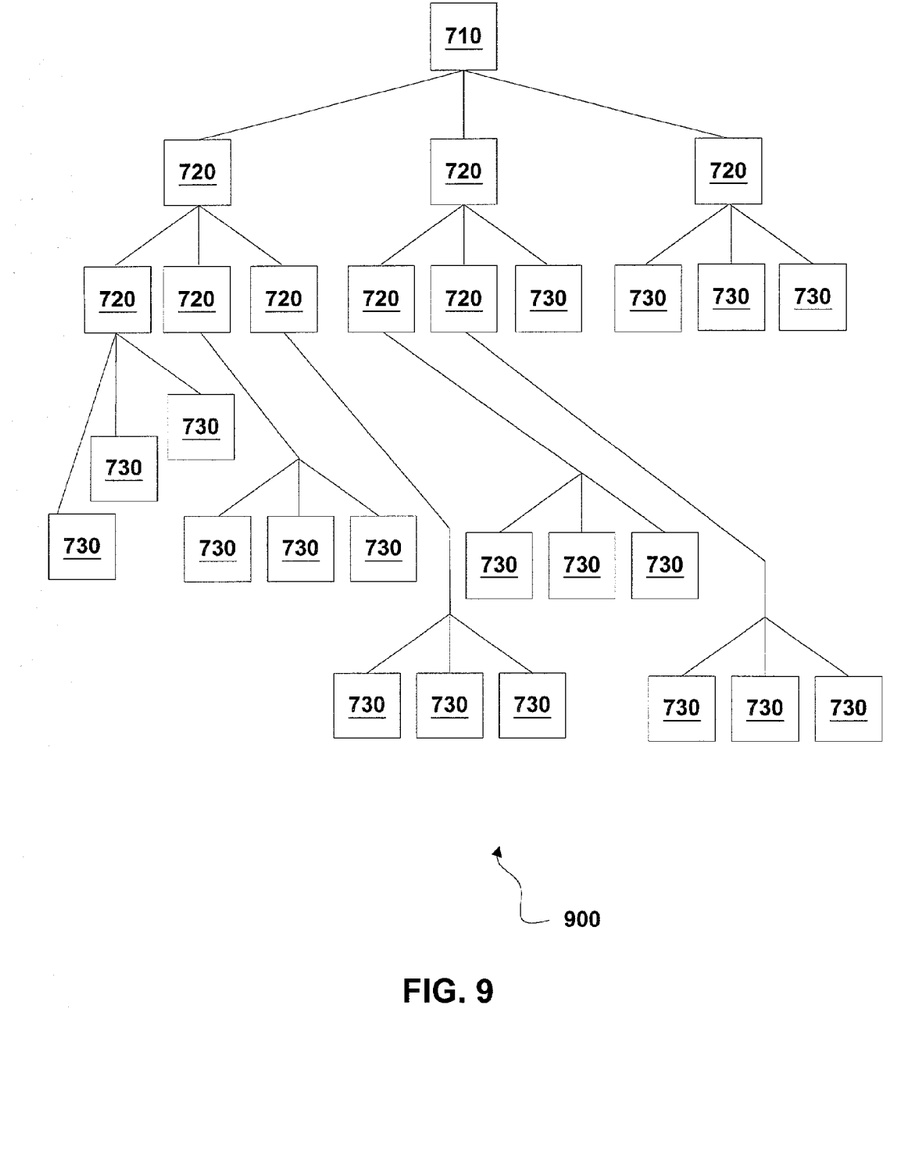
FIG. 9 illustrates the tree data structure of FIG. 7 after balancing.

As shown in FIG. 8, operations are performed in a step 810 on tree data structure 700 (FIG. 9). These operations include node insertion, deletion, reading, and the like. Each time an operation is performed in step 810, computer code 220 (FIG. 2) determines in a step 820 if the operation was a node insertion. If the operation was not a node insertion then computer code 220 returns to step 810 to perform another operation. If the operation was a node insertion, then computer code, 220 determines, in a step 830, if the element node was inserted at the threshold level. If the element node was not inserted at the threshold level then computer code 220 returns to step 810. If the insertion occurred at the threshold level then tree data structure 700 (FIG. 9) is rebalanced in a step 840. After rebalancing step 840, computer code 220 returns to step 810 and performs further operations on the tree data structure 700.

In an alternative embodiment, the threshold level compared with the insertion level in step 830 is calculated by adding a constant, such as eight, to the depth of the tree data structure 700 determined after rebalancing step 840. This approach allows tree data structure 700 to grow a constant number levels deeper than the minimum number of levels required to hold the elements nodes within tree data structure 700.

After the rebalancing, tree data structure 700 may be organized as tree data structure 900 shown in FIG. 9. In a preferred embodiment, the rebalancing includes use of the two phase process discussed with respect to FIGS. 1–6, that is, the division of the rebalancing operation into tasks executed in the update phase of step 130 (FIG. 1) and the commit phase of step 140. In this manner the rebalancing operation can be executed concurrently with other operations executing on the tree data structure 700.

Several embodiments are specifically illustrated and/or described herein. However, it will be appreciated that modifications and variations are covered by the above teachings and within the scope of the appended claims without departing from the spirit and intended scope thereof.

I claim:

1. A method for executing an operation upon a linked data structure having at least one element, the method comprising the steps of:

performing a first set of operation tasks in a first phase, the first set of operation tasks operable to effect a first set of element state transitions comprising
 (a) a valid state to a pending delete state transition,
 (b) a pre-associated state to a pending insert state transition, and
 (c) a pending insert state to a hidden state transition;
developing a second set of operation tasks, the second set of operation tasks operable to effect a second set of element state transitions and being associated with a set of pointers to the linked data structure, the set of pointers being stored external to the linked data structure, the second set of element state transitions being distinct from the first set of element state transitions; and
performing the second set of operation tasks in a second phase using the set of pointers.

2. A method for executing an operation upon a linked data stricture having at least one element, the method comprising the steps of:

performing a first set of operation tasks in a first phase, the first set of operation tasks operable to effect a first set of element state transitions;
developing a second set of operation tasks, the second set of operation tasks operable to effect a second set of element state transitions and being associated with a set of pointers to the linked data structure, the set of pointers being stored external to the linked data structure, the second set of element state transitions being distinct from the first set of element state transitions, and comprising a pending insert state to a valid state transition,
 (a) a pending delete state to an invalid state transition,
 (b) a hidden state to an invalid state transition,
 (c) a pending delete state to a valid state transition,
 (d) a hidden state to a pending insert state transition, and
 (e) a pending insert state to an invalid state transition; and
performing the second set of operation tasks in a second phase using the set of pointers.

3. A method of inserting a plurality of elements into a linked data structure comprising the steps of:

(a) performing a first set of operation tasks in a first phase, the first set of operation tasks operable to effect a first set of element state transitions including a pre-associated state to a pending insert state transition for each of the plurality of elements;
(b) developing a second set of operation tasks, the second set of operation tasks operable to effect a second set of element state transitions including a pending insert state to a valid state transition for each of the plurality of elements; and
(c) performing the second set of operation tasks in a second phase.

4. The method of claim 3 wherein the first set of operation tasks includes navigating existing data structure links.

5. The method of claim 3 wherein the step of developing a second set of operation tasks further comprises developing a set of pointers to the data structure.

6. The method of claim 5 wherein the set of pointers is stored in a list.

7. The method of claim 6 wherein the set of pointers is stored in a first in last out list.

8. The method of claim 3 wherein the first phase comprises performing parallel operations on the linked data structure and the second phase comprises performing serial operations on the linked data structure, each of the serial operations being developed during one of the parallel operations.

9. The method of claim 3 wherein the step of developing a second set of operation tasks further comprises a step of performing a conflicts check.

10. The method of claim 3 wherein the pre-associated state to a pending insert state transition is accomplished by:
    (a) marking an element to be inserted as being pre-associated to the data structure;
    (b) navigating the data structure to an insertion point;
    (c) creating links between the element to be inserted and the data structure at the insertion point, the links created being visible only to the insertion operation; and
    (d) marking the element as being pending insert.

11. The method of claim 10 wherein the pending insert state to a valid state transition is accomplished by:
    (a) creating instructions for making the created links visible to all operations; and
    (b) creating instructions for making existing links at the insertion point invisible to all operations.

12. The method of claim 11 wherein the step of performing the second set of operation tasks further comprises executing the created instructions including marking the element as valid.

13. The method of claim 3 wherein the first set of operation tasks is operable in parallel to maintain the linked data structure in an existing linked state.

14. The method of claim 3 wherein the second set of operation tasks are operable in series to modify an existing linked state.

15. The method of claim 3 wherein the first set of operation tasks are performed on an unlocked portion the linked data structure.

16. The method of claim 3 wherein the second set of operation tasks are performed independently of navigation of the linked data structure.

17. The method of claim 3 wherein the first set of operation tasks are asynchronous and use existing links to navigate the linked data structure.

18. A method of deleting a plurality of elements from a linked data structure comprising the steps of:
    (a) performing a first set of operation tasks in a first phase, the first phase including a valid state to a pending delete state transition for each of the plurality of elements;
    (b) developing a second set of operation tasks, for execution in a second phase including a pending delete state to an invalid state transition for each of the plurality of elements; and
    (c) performing the second set of operation tasks in the second phase.

19. The method of claim 18 wherein the valid state to a pending delete state transition is accomplished by:
    (a) navigating the data structure to a deletion point;
    (b) creating links at the deletion point visible only to the deletion operation; and
    (c) marking the element to be deleted as pending delete.

20. The method of claim 19 wherein the pending delete state to an invalid state transition is accomplished by:
    (a) creating instructions for making the created links visible to all operations; and
    (b) making existing links at the deletion point invisible to all operations.

21. The method of claim 20 wherein the step of performing the second set of operation tasks further comprises executing the instructions including marking members of the plurality of elements to be deleted as invalid.

22. The method of claim 18 wherein each of the first set of operation tasks is visible only to one of a plurality of operations.

23. The method of claim 22 wherein the second set of operation tasks is visible to each of the plurality of operations.

24. The method of claim 18, wherein developing the second set of operation tasks includes developing a series of pointers to elements of the linked data structure and storing the series of pointers external to the linked data structure.

25. The method of claim 18, wherein the first set of operation tasks are performed in parallel on the linked data structure in an unlocked state and the second set of operation tasks are performed in series.

26. The method of claim 18, wherein the second set of operation tasks are performed by navigating to a plurality of elements within the linked data structure using a plurality of pointers external to the linked data structure.

27. A method of inserting a plurality of elements into a linked data structure, the method comprising:
    in a first phase
        navigating the linked data structure to a first insertion point for insertion of a first member of the plurality of elements,
        associating the first member of the plurality of elements with the linked data structure, the first member of the plurality of elements being in a pending insert state,
        storing a first pointer to the first insertion point in a list external to the linked data structure,
        navigating the linked data structure to a second insertion point for insertion of a second member of the plurality of elements,
        associating the second member of the plurality of elements with the linked data structure, the second member of the plurality of elements being in a pending insert state,
        storing a second pointer to the second insertion point in the list external to the linked data structure, storing the first pointer and storing the second pointer; and
    in a second phase separate from the first phase
        reading the first pointer from the list,
        using the read first pointer to navigate to the first insertion point,
        completing the insertion of the first member of the plurality of elements in the linked data structure,
        reading the second pointer from the lines,
        using the read second pointer to navigate to the second insertion point, and
    completing the insertion of the second member of the plurality of elements in the linked data structure.

28. A computer readable medium having stored therein:
    a code segment configured for performing a first set of operation tasks in a first phase, the first set of operation tasks operable to effect a first set of element state transitions including a pre-associated state to a pending insert state transition for each of the plurality of elements;
    a code segment configured for developing a second set of operation tasks, the second set of operation tasks operable to effect a second set of element state transitions including a pending insert state to a valid state transition for each of the plurality of elements; and
    a code segment configured for performing the second set of operation tasks in a second phase, to insert a plurality of element into the linked data structure.

29. A computer readable medium having stored therein:
a code segment configured for performing a first set of operation tasks in a first phase, the first phase including a valid state to a pending delete state transition for each of the plurality of elements;
a code segment configured for developing a second set of operation tasks, for execution in a second phase including a pending delete state to an invalid state transition for each of the plurality of elements; and
a code segment configured for performing the second set of operation tasks in the second phase, to delete a plurality of elements from a linked data structure.

30. A computer readable medium having stored therein:
a code segment configured for performing a first set of operation tasks in a first phase, the first set of operation tasks operable to effect a first set of element state transitions comprising
   (a) a valid state to a pending delete state transition,
   (b) a pre-associated state to a pending insert state transition, and
   (c) a pending insert state to a hidden state transition;
a code segment configured for developing a second set of operation tasks, the second set of operation tasks operable to effect a second set of element state transitions and being associated with a set of pointers to a linked data structure, the set of pointers being stored external to the linked data structure, the second set of element state transitions being distinct from the first set of element state transitions; and
a code segment configured for performing the second set of operation tasks in a second phase using the set of pointers.

31. A computer readable medium having stored therein:
a code segment configured for performing a first set of operation tasks in a first phase, the first set of operation tasks operable to effect a first set of element state transitions;
a code segment configured for developing a second set of operation tasks, the second set of operation tasks operable to effect a second set of element state transitions and being associated with a set of pointers to a linked data structure, the set of pointers being stored external to the linked data structure, the second set of element state transitions being distinct from the first set of element state transitions, and comprising
   (e) a pending insert state to a valid state transition,
   (f) a pending delete state to an invalid state transition,
   (g) a hidden state to an invalid state transition,
   (h) a pending delete state to a valid state transition,
   (i) a hidden state to a pending insert state transition, and
   (f) a pending insert state to an invalid state transition; and
a code segment configured for performing the second set of operation tasks in a second phase using the set of pointers.

* * * * *